March 26, 1963
C. A. ROE ET AL
3,083,292
TRAILER LIGHT SUPPORT
Filed Jan. 27, 1961
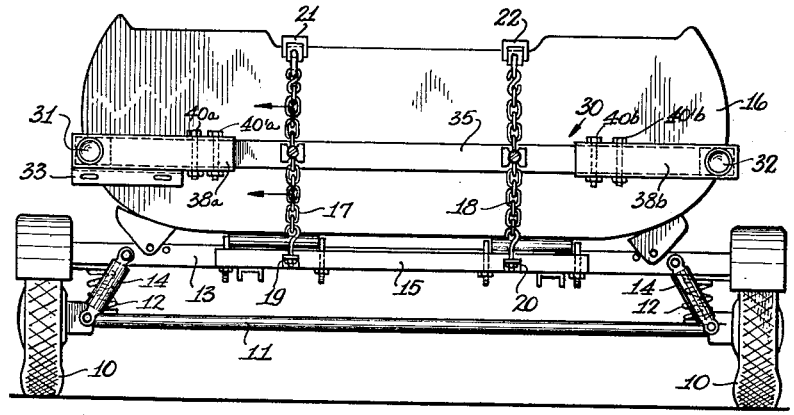
Fig. 1.
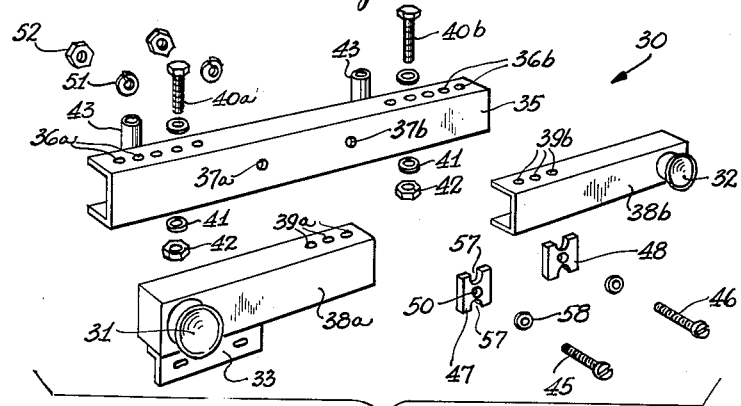
Fig. 2.
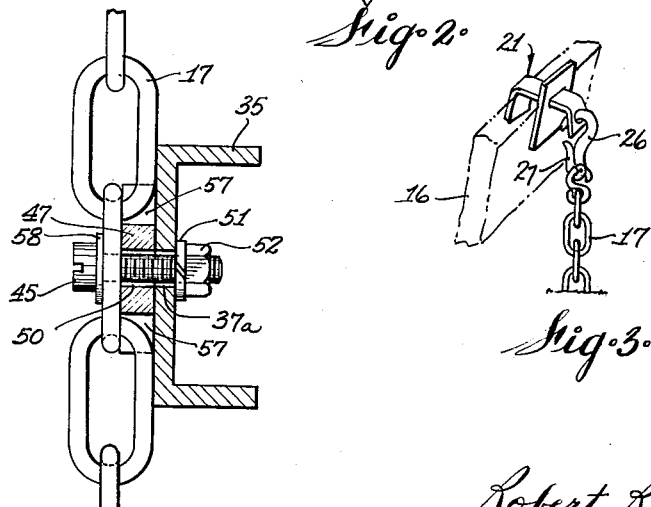
Fig. 4.
Fig. 3.
INVENTORS
Robert R. Roe
Charles A. Roe
BY
Harold A. Weir
ATTORNEY

United States Patent Office 3,083,292
Patented Mar. 26, 1963

3,083,292
TRAILER LIGHT SUPPORT
Charles A. Roe and Robert R. Roe, both of 614 Woolwich St., Guelph, Ontario, Canada
Filed Jan. 27, 1961, Ser. No. 85,314
3 Claims. (Cl. 240—8.3)

This invention relates to a trailer light support, and in particular it relates to a detachable support for providing lights for the rear of a trailer.

Trailers that are in current use for transporting boats and the like, normally have the trailer lights mounted in a fixed position at the rear of the trailer or underneath the trailer towards the rear. The lights may include stoplights, clearance lights and turn signal lights. The lights are not always in a position to provide the best visibility and it is, of course, desirable to mount the lights where the visibility is best and in accordance with local regulations. For example, a boat frequently overhangs the rear of the trailer carrying it, and lights mounted on the rear of the trailer are sometimes partly obscured by the overhang. Further, the clearance lights, or lights that indicate the width of the trailer load are not adjustable on prior art trailers and provide a poor indication of load width in the cases where the load exceeds the width of the trailer. Another disadvantage in prior fixed light arrangements on trailers used to carry boats is that the lights and wiring are submerged when the boat is launched or loaded.

This invention seeks to overcome the disadvantages of the prior art trailer lighting arrangements by providing a light support that is adjustable in width and that can be detachably mounted at a desired height at the rear of a trailer.

It is therefore an object of this invention to provide a detachable light support for a trailer.

It is another object to provide a light support that can be quickly attached at the rear of a trailer at a suitable height.

It is yet another object of this invention to provide a detachable trailer light support that is adjustable in width so that clearance lights can be positioned to mark the width of the trailer or load.

It is a further object of this invention to provide a mounting arrangement for a light support that can be operated quickly to mount or dismount the light support from the trailer.

Further objects and advantages of the invention will appear from the following description taken in conjunction with the drawings in which:

FIGURE 1 is a rear view of a boat trailer with a loaded boat and a trailer light support according to one embodiment of the invention in position at the rear of the trailer.

FIGURE 2 is an exploded isometric view showing parts of the light support.

FIGURE 3 is an isometric view showing a portion of a chain to which the light support may be fastened and indicating one known manner of fastening the chain to the boat or to the trailer, and FIGURE 4 is a sectional view of a portion of a chain on an enlarged scale showing the chain fastened to the light support according to the invention.

Referring to FIGURE 1 there is shown the rear view of a boat trailer with a loaded boat. The boat trailer is used by way of example to show the positioning of a trailer light support according to one embodiment of the invention. The boat trailer has wheels and tires 10 which rotate on axle member 11. Springs 12 and shock absorbers 14 are between the wheel assembly and a frame member 13 on each side. A tail member 15 extends rearward to form the rear of the trailer. Such boat trailers are well known.

A boat 16 is shown mounted on the trailer. Two chains 17 and 18 extend from brackets 19 and 20 on tail member 15 around the stern of the boat 16 and are fastened to brackets or clamp members 21 and 22, respectively, on the stern of the boat. When the boat is secured to the trailer the chains 17 and 18 are taut so that the boat is held against the trailer at the rear. The front of the boat should of course, be secured to the trailer also.

One convenient way of tightening and clamping the chains 17 and 18 is shown in FIGURE 3, where a portion of chain 17 is shown. A bracket or clamp member, or any equivalent member that can be affixed to the stern of the boat, is shown as 21. A hook 26 with clamping lever 27 is fastened to one end of the chain. When the boat 16 is to be secured to the trailer, the hook 26 is inserted in the bracket 21 and the clamping lever 27 is moved to the closed position to tighten the chain. The arrangement of clamping lever 27 and hook 26 is such that the lever has an over-center movement which locks the lever in the closed or tightened position. As previously noted, such tightening and clamping means are known.

The two chains 17 and 18 serve as the members to which the light support according to the present invention is attached. The light support is indicated generally in FIGURE 1 as a unit 30. The light support unit 30 has two light assemblies 31 and 32 mounted on either end. These light assemblies may include the usual multiple filament bulbs to provide clearance lights, stop-lights, turn-signal lights, and a light to illuminate the license plate (not shown) mounted on bracket 33. It will be apparent that the light assemblies 31 and 32 may include separate bulbs to provide any or all of the functions mentioned and if separate bulbs are used they may be mounted in separate holders or "lights."

The detail of the light support unit 30 is best described with reference to FIGURE 2 in which a rigid center member 35 is provided with a series of spaced holes 36a and a series of spaced holes 36b, one series of holes towards each side of the center member 35. The center member 35 is conveniently of a channel-like section although a closed rectangular section, a partly curved section, or equivalent section would be satisfactory. Two holes 37a and 37b are provided in member 35 to afford means by which the member is affixed to the trailer as will be described hereinafter.

Two rigid side members 38a and 38b are constructed to fit over the center member 35 and slidably engage the center member. The side member 38a is provided with holes 39a and the side member 38b is provided with holes 39b. The location of the holes 39a are such that when side member 38a is in position on center member 35, the side member 38a can be slid along the center member 35 to several positions where at least one of the holes 39a is in registry with one of the holes 36a. The spacing of the holes 36a and 39a is preferably such that at least a pair of holes 39a are in registry with a pair of holes 36a at each selected position. This would, of course, not be the case in the extreme inwards and outwards positions of registry where only one hole would be in registry. However, if equal spacing of the holes were used, at least a pair of holes would be in registry at all the intermediate positions. The same location of holes would apply to a consideration of the other side member 38b, that is, would apply to holes 36b and 39b.

A rod-like fastening member 40a is inserted through one set of holes 36a and 39a to fix or lock the side member 38a in position on the center member 35. It will be apparent that the use of two rod-like fastening members, 40a and 40a' as shown in FIGURE 1 for example, will increase the rigidity of the locking of member 38a to member 35. As mentioned in connection with the spacing of the holes 39a and 36a, it would be possible to use two rod-like fastening members in all of the available positions where there are holes in registry with one another except for the extreme positions.

Similarly for side member 38b, the rod-like fastening members 40b and 40'b (FIGURE 1) are used to lock the side member 38b to the center member 35. As before, only one such fastening member would be used in the extreme inwards and outwards positions of side member 38b. Only one locking member on each side, namely 40a and 40b is shown in FIGURE 2 to simplify the drawing.

It will be seen that the side members 38a and 38b with the center member 35 form an extensible unit which may be locked in one of several selectable widths.

The rod-like fastening members 40a, 40'a, 40b, and 40'b are shown as bolts where they appear in the drawings. The bolts are shown as being restrained or fastened by lock washers 41 and nuts 42. The use of bolts and nuts for the rod-like fastening members is a preferred embodiment and may include spacer cylinders 43 which fit in the back of the channel portion of center member 35 to prevent member 35 from deforming when the bolts are tightened. However, the rod-like fastening members could comprise studs or simply pins restrained by some suitable means.

It will be apparent that other means could be used for locking side members 38a and 38b to center member 35. For example, a clamping unit could be mounted on the back of each side member 38a and 38b to squeeze the back portions of the channel together and thereby bind the side members to the center member.

The side member 38a has a bracket 33 mounted on its underside towards the outer end. This bracket 33 is provided with holes to afford means to attach a license plate. The light assembly 31 provides light which is directed towards the bracket to illuminate a license plate when one is mounted on the bracket.

The "light" or light assembly 31 is mounted on side member 38a and the light assembly 32 is mounted on side member 38b. As was previously described, the light assemblies 31 and 32 may include clearance lights. By adjusting the side members 38a and 38b, a width of the light support unit 30 can be selected which is substantially the width of the trailer or load, whichever is larger. When the light support unit is properly mounted at the rear of the trailer, the clearance light portion of assemblies 31 and 32 will indicate the sides of the trailer or load.

The extensible light support unit 30 is fastened to the chains 17 and 18 by rod-like fastening members 45 and 46 which pass through a link of each chain and through holes 37a and 37b, respectively. The rod-like fastening members 45 and 46 also pass through two similar washer-like devices 47 and 48 of unusual design. The washer-like device 47, or simply washer 47, is best seen in FIGURES 2 and 4. Washer 47 is generally H-shaped and has a central hole 50 with two indentations or deformations 57 in opposite edges. The washer 47, when it is in position, supports one link of chain 17 flat against its surface with the hole 50 substantially aligned with the center of the link lying flat on its surface. The two deformations 57 provide space for the ends of the links on each side of the supported link. A rod-like fastening member 45 passes through a link on chain 17, the hole 50, and the hole 37a, and is provided with some means to restrain it in its position. As was the case with fastening members 40, the rod-like fastening member 45 is conveniently a bolt restrained by a lock washer 51 and a nut 52. However, member 45 may, as before, be a stud or a pin held in position by a spring clip, cotter pin, or the like. A washer 58 may be required on bolt 45 depending on the head size of the bolt and the size of the links in chain 17.

Washer 48 is identical to washer 47 and is used in the same manner on chain 18. A similar fastening device, such as bolt 46 is used in conjunction with washer 48. The associated lock washer and nut are not shown in FIGURE 2.

It will be seen that the light support unit 30 can be positioned at different vertical levels by using different links in chains 17 and 18. The unit 30 can therefore be set at the most desirable height and in accordance with any local lighting regulations that might affect its positioning.

The light support is held in position by two rod-like fastening members 45 and 46 as was described. When these fastening members 45 and 46 are withdrawn, the unit 30 is free. The light support unit 30 is therefore easily removable. When, for example, the boat is to be launched, the unit 30 can be quickly removed and kept dry. It is easily remounted when needed.

Other flexible members or flexible lines are frequently used to fasten the stern of a boat to a trailer. One example of this is the use of a rope or cable. Ropes, cables and chains are referred to herein as "flexible lines" for ease of description. A light support according to this invention can be adapted to fasten to taut ropes or cables as well as to chains. When the support unit 30 is to be fastened to ropes, the washers 47 and 48 are not used. Instead washers accommodating the rope would be used. A washer provided with a hole and a straight depression across its surface to one side of the hole would be satisfactory. In such a mounting the washer is placed over the rope with the rope between the washer and the surface of member 35. The depression in the washer receives the rope to prevent it slipping out. Thus, to mount a trailer light support to a pair of ropes, two bolts are used with each bolt passing through the hole of such a washer. One bolt then passes through hole 37a and the other through hole 37b. A nut is placed on each bolt and tightened until the rope is securely squeezed between the washer and member 35. As with chains, two ropes are secured by washers and bolts through holes 37a and 37b.

The wiring has not been shown on the drawings as it is straight forward and well known in the art. The wiring circuits would depend on the number of lights included in the lighting assemblies 31 and 32. If clearance lights are included they should be wired into the electrical circuit of the vehicle towing the trailer so that they go on when the lights of the towing vehicle are on. If a light for the license plate is included it should be wired into the circuit similarly to go on when the lights of the towing vehicle are on. If stop-lights are included they should be wired into the electrical system of the towing vehicle to go on at the same time the stop-lights of the towing vehicle go on, i.e. when the brakes are applied. If turn signal lights are included they should be wired to the electrical turn signal circuit of the towing vehicle so that the appropriate turn signal light on the light support goes on whenever the corresponding turn signal light on the towing vehicle goes on. It is convenient to run the wiring from light assemblies 31 and 32 to a connector plug. The electrical system of the towing vehicle can be wired to a mating plug so that the connection of the two plugs will complete the trailer light circuits. It is customary to use such connector plugs for the lighting circuits of trailers and it is believed that a drawing of the connector plug and the wiring extending between the light assemblies 31 and 32 and such a plug are not necessary for an understanding of this invention.

Thus, a trailer light support, as set forth above, provides trailer lights adjustable in width and height and that is quickly mounted and dismounted.

We claim:

1. A light support comprising a rigid channel-like center member and two rigid side members longitudinally and slidably engaging each end of said center member to form a straight extensible unit, said side members each having a length that is a minor portion of the length of the center member, said center member and said side members being provided with a plurality of holes therethrough spaced apart by a predetermined distance, one of the holes in each said side member registering with a hole in said center member at a plurality of positions of each said side member on each end of said center member, at least one rod-like fastening member inserted through the registering holes in each side member and center member, lamp means mounted on each said side member towards the end of each side member farthest from the other side member in said extensible unit, and clamping means fastened to said center member having two flexible line receiving recesses.

2. A light support affixable to two taut chains spaced apart a predetermined distance at the rear of a trailer, said chains each including a first and second link joined together by a third link, said support comprising a rigid channel-like center member and two rigid side members longitudinally and slidably engaging said center member to form a straight extensible unit, said side members each having a length that is a minor portion of the length of said center member, fastening means engaging said side members and said center member to secure said side members in a selected position on either end of said center member, lamp means mounted on each said side member towards the end of said side member farthest from the outer side member in said extensible unit, said center member being provided with a pair of holes spaced apart substantially said predetermined distance, two washers each having a central hole and indentations in opposite sides to make said washers H-shaped, in each said washer one of said indentations receiving a portion of a first link and the opposite indentation receiving a portion of a second link in a respective one of said chains, said third link in the respective chain lying substantally flat on the surface of said washer with the center of said third link substantially aligned with the axis of the central hole in said washer, a pair of bolts, each said bolt passing through said third link on one of said chains, the central hole in the respective washer and the respective one of said pair of holes in said center member, and a nut securing each said bolt.

3. A light support comprising in combination a straight rigid center member and two straight rigid side members longitudinally and slidably engaging said center member to form a straight extensible unit, said side members each having a length that is a minor portion of the length of said center member, fastening means engaging said side members and said center member to lock said side members in a selected position on either end of said center member, at least one light mounted on each side member towards the end of said side member farthest from the other side member, said center member being provided with at least a pair of spaced holes, at least two washers each having a flexible line receiving recess and each provided with a hole, a bolt for each said washer passing through said hole in a respective washer and through a respective one of said pair of holes in said center member, and a nut fastening each bolt.

References Cited in the file of this patent

UNITED STATES PATENTS

| | | |
|---|---|---|
| 1,032,607 | Ingalls | July 16, 1912 |
| 2,353,035 | Hopp et al. | July 4, 1944 |
| 2,569,518 | Deutsch et al. | Oct. 2, 1951 |
| 2,783,367 | Locke | Feb. 26, 1957 |
| 2,787,476 | Holschlaw | Apr. 2, 1957 |

FOREIGN PATENTS

| | | |
|---|---|---|
| 1,124,011 | France | June 25, 1956 |